United States Patent
Kawano (10) Patent No.: US 7,515,159 B2
(45) Date of Patent: Apr. 7, 2009

(54) RECONFIGURABLE ADDRESS GENERATION CIRCUIT FOR IMAGE PROCESSING, AND RECONFIGURABLE LSI COMPRISING THE SAME

(75) Inventor: Tetsuo Kawano, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 377 days.

(21) Appl. No.: 11/346,177

(22) Filed: Feb. 3, 2006

(65) Prior Publication Data

US 2007/0083579 A1 Apr. 12, 2007

(30) Foreign Application Priority Data

Sep. 29, 2005 (JP) ............... 2005-284718

(51) Int. Cl.
*G06F 12/02* (2006.01)
*G06F 12/06* (2006.01)
*G06F 12/00* (2006.01)
*G09G 5/00* (2006.01)
*H02J 12/00* (2006.01)
*G11C 7/00* (2006.01)
*G11C 8/02* (2006.01)

(52) U.S. Cl. .............. 345/564; 345/600; 345/643; 345/571; 345/574; 711/1; 711/147; 711/220; 365/189.011; 365/230.01; 340/825.52; 377/116

(58) Field of Classification Search ......... 345/600–601, 345/606, 611–615, 620, 643, 644, 547, 673–674, 345/536–538, 543–544, 560–565, 571, 574, 345/540–541, 572–573; 348/537–538, 543–544, 348/619–620; 711/1, 109, 147, 153, 100, 711/219–220, 214, 173; 365/230.01
See application file for complete search history.

(56) References Cited

U.S. PATENT DOCUMENTS

| | | | | |
|---|---|---|---|---|
| 5,021,977 A | * | 6/1991 | Sakaguchi | ............ 345/559 |
| 5,227,863 A | * | 7/1993 | Bilbrey et al. | ............ 348/578 |
| 5,874,995 A | * | 2/1999 | Naimpally et al. | ...... 375/240.25 |
| 6,930,688 B1 | * | 8/2005 | Pether et al. | ............ 345/502 |

FOREIGN PATENT DOCUMENTS

| | | |
|---|---|---|
| JP | 62-264094 | 11/1987 |
| JP | 10-124025 | 5/1998 |
| JP | 2001-312481 | 11/2001 |

* cited by examiner

*Primary Examiner*—Wesner Sajous
(74) *Attorney, Agent, or Firm*—Fujitsu Patent Center

(57) ABSTRACT

A reconfigurable address generation circuit for image processing is configured to an arbitrary state based on configuration data generates a read address for reading out image data of pixel units having a plurality of rows and columns from a memory which stores image data. As the configuration data, there are set a X, Y count end value of the read out pixel unit, a width value of the image in the memory, and edge information for clip processing. The address generation circuit has X counter; Y counter; an X, Y clip processing circuits which convert the count value of the X, Y counter according to the left, right top and bottom edge information; and an address calcuration circuit which generates the reading out address, based on the count values from the X and Y clip processing circuits and the width value.

9 Claims, 12 Drawing Sheets

FIG.7 ADD1= x + y*W

RECONFIGURABLE ADDRESS GENERATION CIRCUIT FOR IMAGE PROCESSING, AND RECONFIGURABLE LSI COMPRISING THE SAME

CROSS-REFERENCE TO RELATED APPLICATIONS

This application is based upon and claims the benefit of priority from the prior Japanese Patent Application No. 2005-284718, filed on Sep. 29, 2005, the entire contents of which are incorporated herein by reference.

BACKGROUND OF THE INVENTION

1. Field of the Invention

The present invention relates to a reconfigurable address generation circuit for image processing and to a reconfigurable LSI which comprises the same, and more particularly relates to an address generation circuit which, during image processing, generates read address for image data in a memory.

2. Description of the Related Art

A reconfigurable integrated circuit device (a LSI) comprises a plurality of processor elements and a network which connects between these processor elements, and the structure of the processor elements and the structure of the network between the processor elements can be set up into any arbitrary calculation state or arithmetic circuit, based on configuration data which a sequencer outputs in response to an external or an internal event.

A prior art type programmable microprocessor reads out commands stored in a memory in order and processes them sequentially. Accordingly, the commands which can be executed simultaneously by a single microprocessor are limited in number, and there is a limit to the processing capability.

In this connection, in a reconfigurable integrated circuit device, there are provided in advance a plurality of processor elements of a plurality of types such as logical arithmetic units (ALUs) which are endowed with the functions of adders, multipliers, comparators and the like, delay circuits, counters and so on; and, furthermore, a network is provided which connects between these processor elements, and the processor elements and network may be reconfigured to any desired structure, based on configuration data from a state transition control unit which includes a sequencer, and performs predetermined calculations in this calculation state. If a plurality of arithmetic circuits are configured by the plurality of processor elements, data processing may be performed in these arithmetic circuits simultaneously. And, when the data processing in one calculation state has been completed, another calculation state can be set up with a different set of configuration data, and different data processing can be performed in this state.

By being reconfigured to different calculation states dynamically in this manner, a reconfigurable integrated circuit device is able to enhance the data processing capability with respect to large volumes of data, and thus is able to enhance the overall processing efficiency. Such a reconfigurable integrated circuit device is, for example, described in Japanese Patent Laying Open Publication 2001-312481.

The above described reconfigurable LSI may be reconfigured dynamically to arithmetic circuits which have been optimized for various different types of data processing. Image processing is a representative one of these types of data processing. Filter processing such as smoothing processing or the like such as for example pixel data for 3×3 pixels, upon a single frame of bitmap image data, is included in such image processing. In this case, along with processing the subject pixels, calculation processing is performed upon the image data for the pixels surrounding them. Other types of image processing include processing upon the bitmap image data for a single frame in units of 8×8 pixels for extraction of high frequency components and low frequency components. Such processing is known to be performed in an MPEG decoder. In this extraction processing as well, calculation is performed upon the image data in pixel units having a plurality of rows and columns, and it requires the image data for the surrounding pixels.

In this type of image processing, the bitmap image data stored in an external memory is read out by predetermined blocks and is temporarily stored in an internal memory, and then this image data is read out from the internal memory and image processing is performed thereupon. In this case, the image data for the pixels surrounding the block is also stored in the internal memory, and the image data for a block which includes these surrounding pixels is read out; i.e., the image data including the surrounding pixels is read out by 3×3 pixel units or 5×5 pixel units or the like. In order to do this, a processor element which performs address generation for reading out image data from the internal memory is required.

However, when processing the image data for the pixels positioned on the left, right, top, and bottom edges of the frame, since no image data exists to the outside of the frame, therefore it is necessary to read out repeatedly the image data for the pixels which are positioned at the frame edge. Accordingly, it is required to generate a different address for being read out, according as to whether or not the pixel to be read out is one which is outside the frame. In other words, in the case of a pixel which is internal to the frame, an address is generated which simply corresponds to the pixel; while, in the case of a pixel which is outside the edge of the frame, an address is generated which, instead of corresponding to this pixel, corresponds to a pixel in an edge position.

However, when configuring a variant read out address generation circuit for the above described variant reading out operation by processor elements, the number of processor elements which are required is increased, and this is not desirable from the point of view of a reconfigurable LSI.

SUMMARY OF THE INVENTION

Thus, an object of the present invention is to provide a address generation circuit for image processing which is reconfigurable depending on the positions of the pixels subject to processing, and a reconfigurable LSI incorporating such an address generation circuit.

In order to attain the above described object, according to a first aspect thereof, the present invention proposes a reconfigurable address generation circuit for image processing, which is configured to an arbitrary state based on configuration data, and which generates a readaddress for reading out image data of pixel units having a plurality of rows and columns from a memory which stores image data wherein, as the configuration data, there are set a X count end value corresponding to a number of columns of the read out pixel unit and a Y count end value corresponding to a number of rows of the read out pixel unit, a width value which indicates the number of columns of the image in the memory, and edge information which indicates an edge, for which clip processing is performed on the read out pixel unit; the address generation circuit comprising: an X counter which counts repeatedly up to the X count end value; a Y counter which counts up to the Y count end value in response to a carry signal of the X counter; an X clip processing circuit which converts the count value of the X counter according to the left and right edge information; a Y clip processing circuit which converts the count value of the Y counter according to the top and bottom edge information; and an address calcuration circuit which generates the reading out address, based on the count values from the X and Y clip processing circuits and the width value.

According to this aspect of the present invention as described above, it is possible to produce any arbitrary address generation circuit, according to the configuration data.

DESCRIPTION OF THE PREFERRED EMBODIMENTS

In the following, the present invention will be explained in terms of preferred embodiments thereof. However, the technical scope of the present invention is not limited to these embodiments, but rather is to be defined by the scope of the appended claims and equivalents thereof.

Figure 1:
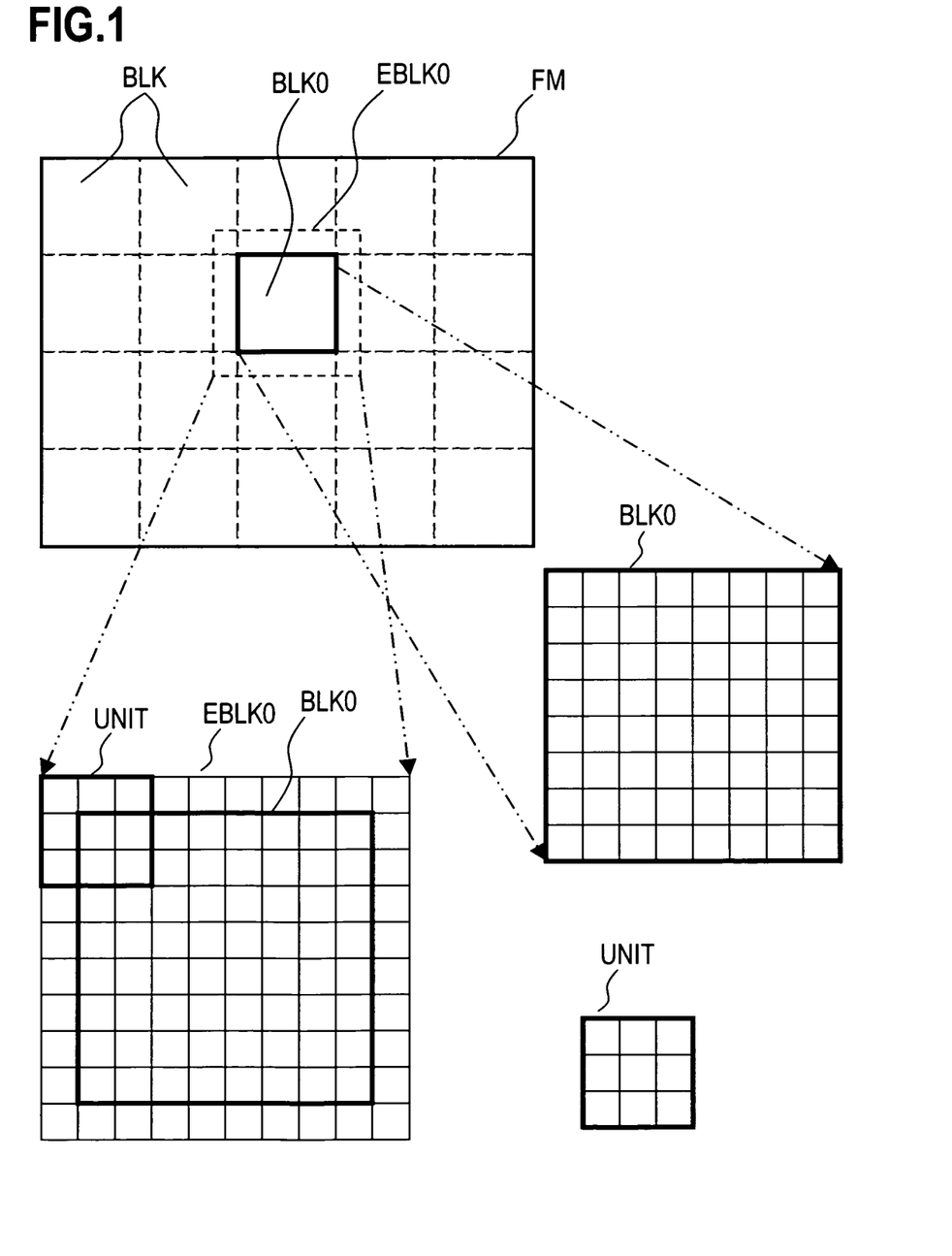
FIG. 1 is a figure for explanation of address generation during image processing.

FIG. 1 is a figure for explanation of address generation during image processing. The image data of a single frame FM (one screen) can be subdivided into a plurality of blocks BLK, and, normally, is stored in an external memory. The image data is, for example, RGB data in pixel units, and consists of 32 bits in total, if it is supposed that 8 bits are used for each color. And, when performing image processing with an LSI, image data in block units is transferred from the external memory to the internal memory, and image data for a block is read out from this internal memory to perform predetermined image processing, or image data in units of 3×3 pixels is read out to perform a filter processing. Generally, for filter processing, in order to filter process, the image data of pixel subject to processing and of the eight neighboring pixels is necessary. Furthermore, for other image processing, the image data for the 5×5 pixel unit centered upon the pixel subject to processing, or for the N×N pixel unit (where N is an integer greater than or equal to 3) is necessary.

As described above, in the image processing for the pixels of a block, image data for the pixels which surround the outer edges of this block is also required. Accordingly, when transferring the image data for the block BLK0 from the external memory to the internal memory, the image data of the enlarged block EBLK0 which also includes the pixels which surround this block BLK0 is transferred, so that it is made possible to correspond to image processing performed by reading out the image data from the internal memory. In other words, as shown in FIG. 1, the image data of the enlarged block EBLK0 is transferred to the internal memory, the image data for the surrounding pixels in addition to the pixels of the block BLK0 is read out from this internal memory, and predetermined image processing such as filter processing and the like is performed.

In some cases the unit read out from the internal memory is all the pixels of the enlarged block EBLK0, or in some cases is a 3×3 pixel unit, which is a portion within the enlarged block EBLK0.

Figure 2:
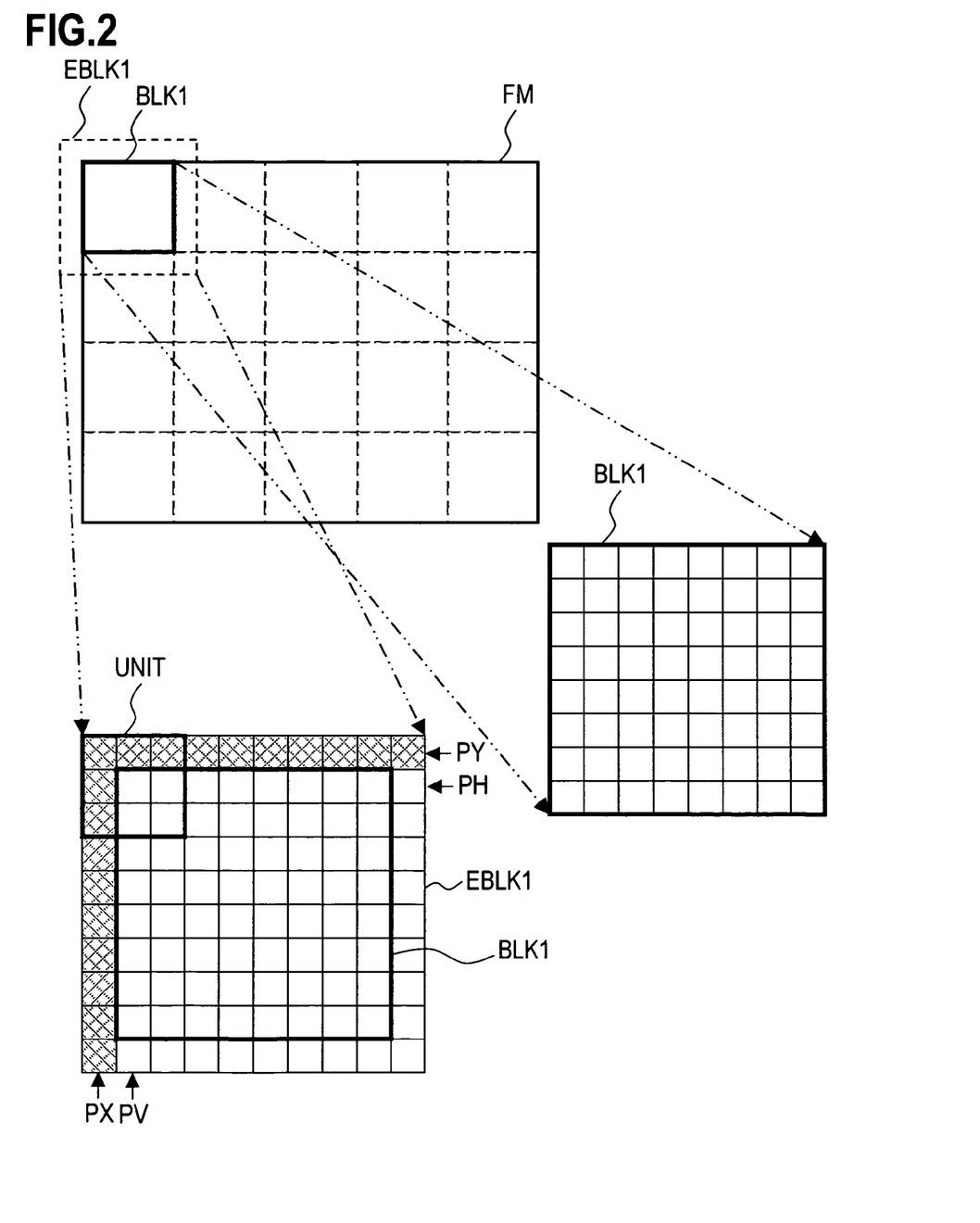
FIG. 2 is a figure for explanation of a problematical point of address generation for image processing.

FIG. 2 is a figure for explanation of a problem with address generation for image processing. As has been explained with reference to FIG. 1, when performing data transfer of the image data of some block BLK0 to the internal memory, the image data of an enlarged block EBLK1, which is enlarged by the number of pixels required for image processing, is transferred. For this, data transfer is performed from the external memory for the enlarged block EBLK1 which includes the pixels surrounding the block BLK1 subject to precessing. However, when performing data transfer from the external memory to the internal memory of the image data of the block BLK1 which is located at the edge portion of the frame FM, since no pixels exist to the left side and to the upper side of the edge of the frame FM, it is not possible to read out from the frame data FM stored in the external memory, image data for the pixel column PX and the pixel row PY on the peripheral portion of the enlarged block EBLK1 (the hatched portions in the figure). For example, even if an attempt is made to perform such reading out, the image data of an improper address is read out, so that it would not be suitable as image data for the surrounding pixels which are to be used in filter processing and the like.

Thus, when reading out the image data for the enlarged block EBLK1 which has been transferred to the internal memory, the image data for the pixel column PX and the pixel row PY are not read out, but rather, reading out is instead performed of the image data in the pixel column PV and the pixel row PH of the block BLK1 which has only normal image data. The same procedure is preformed when reading out a partial pixel unit within the enlarged block EBLK1 as well. This is because the probability is high that the image data in these pixel column PV and pixel row PH resembles the image data in the neighboring pixel column PX and pixel row PY, and it is inconceivable that it should be entirely inappropriate image data.

In this manner, when reading out the image data for a block in the internal memory, it is necessary to change the read out addresses which are created, according to whether the pixels subject to reading out are positioned at the edge of the frame FM, or are not so positioned. Along with this, it becomes necessary to provide address generation circuits of a plurality of types, or to provide an address generation circuit which is capable of exceptional processing at the edge portions. In this embodiment, an address generation circuit which complys with the case of the boundary portions of the frame is implemented by a reconfigurable circuit.

Figure 3:
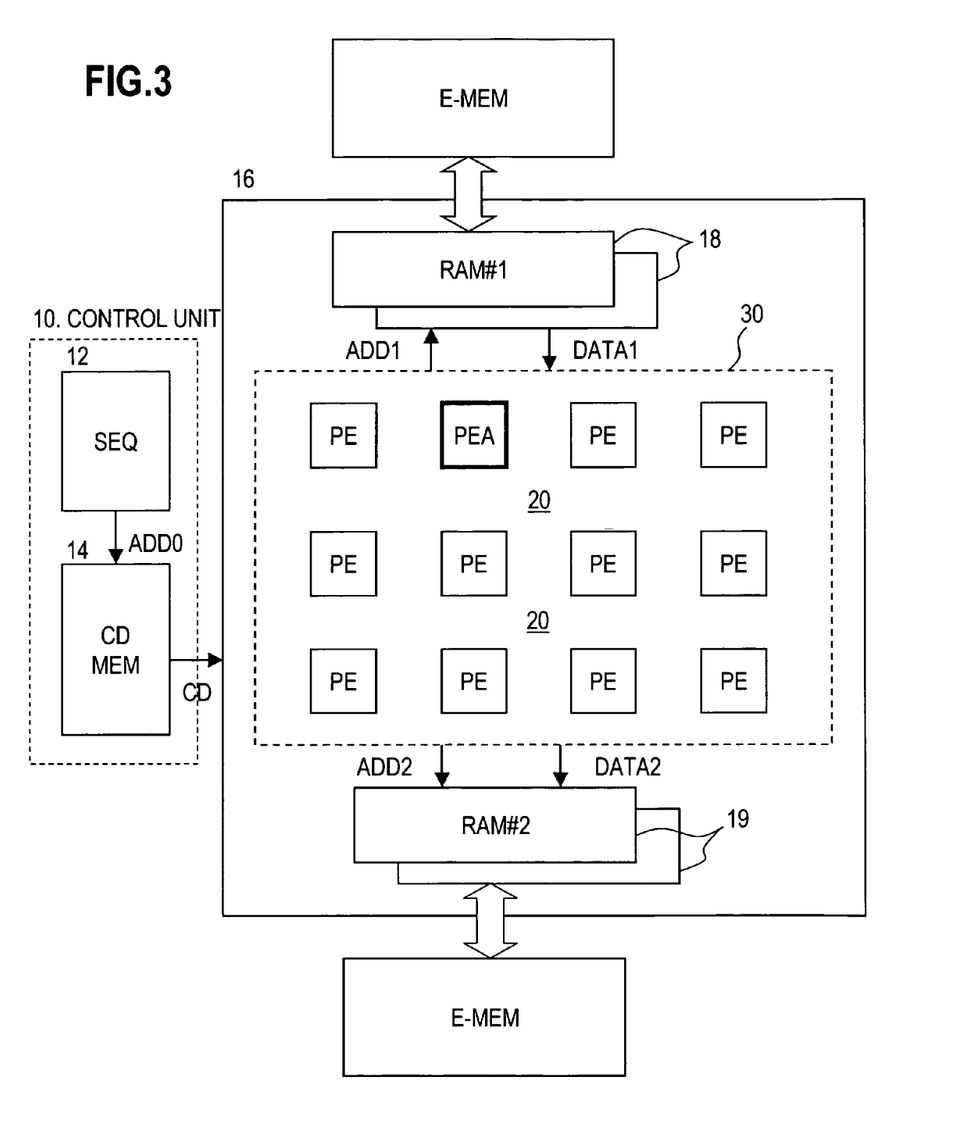
FIG. 3 is a block diagram of a reconfigurable integrated circuit device of this embodiment.

FIG. 3 is a block diagram of a reconfigurable integrated circuit device of this embodiment. A reconfigurable integrated circuit 16 comprises internal memories 18 and 19 for temporary data storage, and a reconfigurable processor array 30. This reconfigurable processor array 30 comprises a plurality of processor elements PE and a network 20 between these processor elements. And the processor array 30 may be dynamically configured to any arbitrary processor state by configuration data CD supplied from a control unit 10, which comprises a sequencer 12 and a configuration memory 14 which stores the configuration data. Furthermore, block data is transferred from an external memory E-MEM to the first internal memory 18 by, for example, direct memory access, and the dynamically configured processors perform predetermined data processing upon this data, with the result of this processing being stored in the second internal memory 19. And the data is transferred from the second internal memory 19 to the external memory E-MEM.

In order for the throughput of memory access not to be deteriorated, the first and second internal memories 18 and 19 have a double buffer structure so that external access and internal access do not compete with one another. In other words, with the internal memories 18 and 19, one of the memory units performs data transfer with external memory, while simultaneously the other memory unit performs data transfer with the processor elements PE within the calculator array 30.

The processor elements PE include a plurality of types of elements, including an ALU element which includes an adder, a subtractor, a comparator and the like, a delay element which includes a delay circuit, a counter elements which includes a counter circuit, a memory element which includes a memory, and the like. Furthermore, the processor elements PE may include memory elements which include internal memory. Yet further, within the processor elements PE, there are comprised elements PEA which can constitute an address generation circuit for reading out data in units of a plurality of pixel rows and columns from the above described internal memory. The structure thereof will be described hereinafter in detail.

Figure 4:
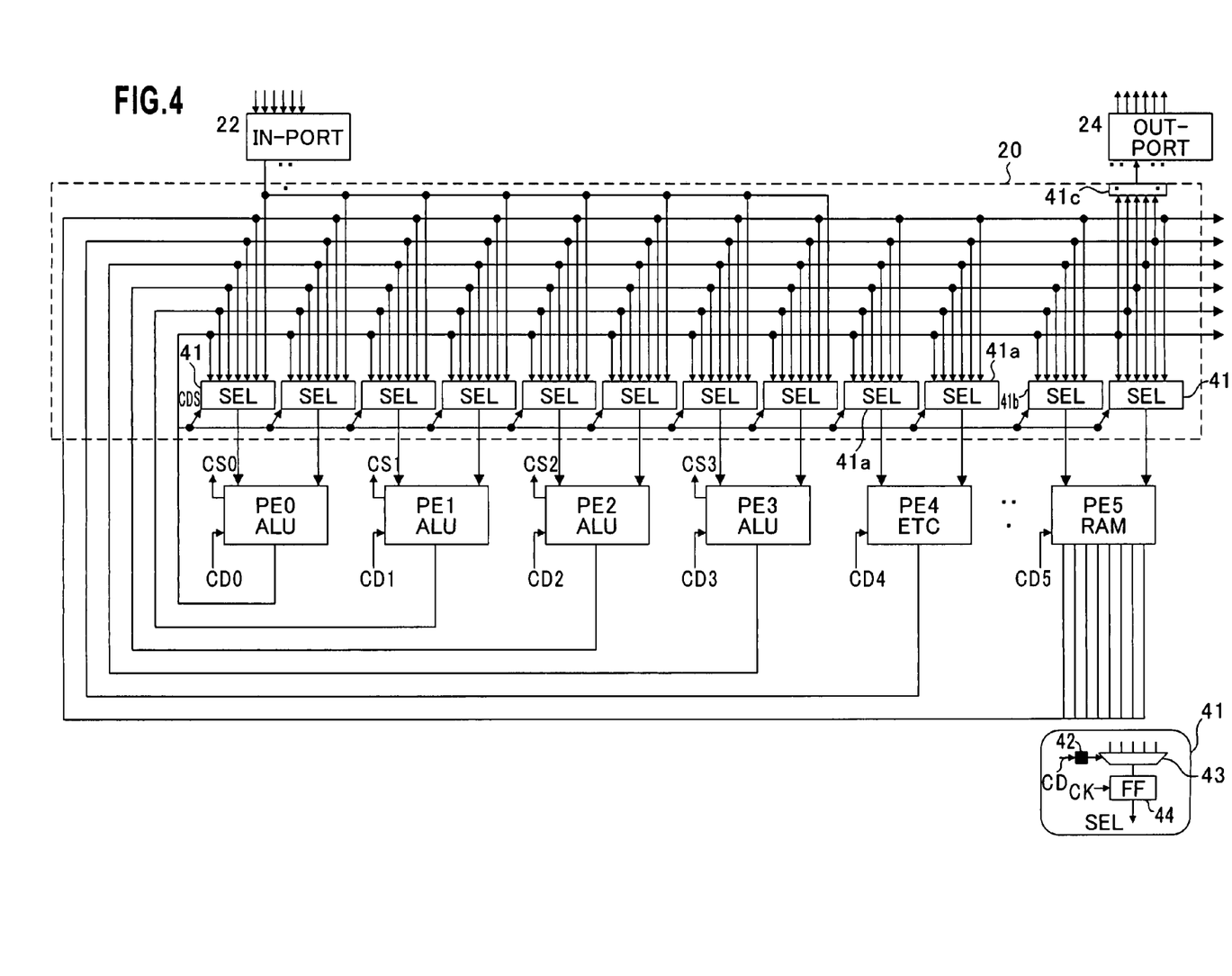
FIG. 4 is a figure showing an example of the structure of a processor array 30 of this embodiment.

FIG. 4 is a figure showing an example of the structure of a processor array 30 of this embodiment. Calculation processing elements PE0 to PE3, a memory processor element PE5, and a different processor element PE4 are made to be connectable via selectors 41, which are switches in a network 20. These various processor elements PE0 through PE5 may be configured to any arbitrary structure, based on configuration data CD0 through CD5; and, furthermore, the selectors 41 (41a, 41b, 41c) in the network 20 may also be configured to any arbitrary structure, based on configuration data CDs.

When each of the processor elements PE has completed its calculation processing, it outputs end signal CS0 to CS3. This end signal is supplied, as an event, to the sequencer 12 of the control unit 10 (refer to FIG. 3), and the next configuration data CD is supplied at an appropriate timing to the processor elements PE, thus setting up a different arithmetic circuit.

As shown at the lower right of the figure by way of example, a selector 41 comprises a register 42 which stores the configuration data CD, a selector circuit 43 which selects an input according to the data in the register 42, and a flip-flop 44 which is synchronized to a clock signal CK and latches the output of the selector circuit 43. Furthermore, the network 20 can also be connected as desired via the selector to an input port 22 and an output port 24 for data.

Figure 5:
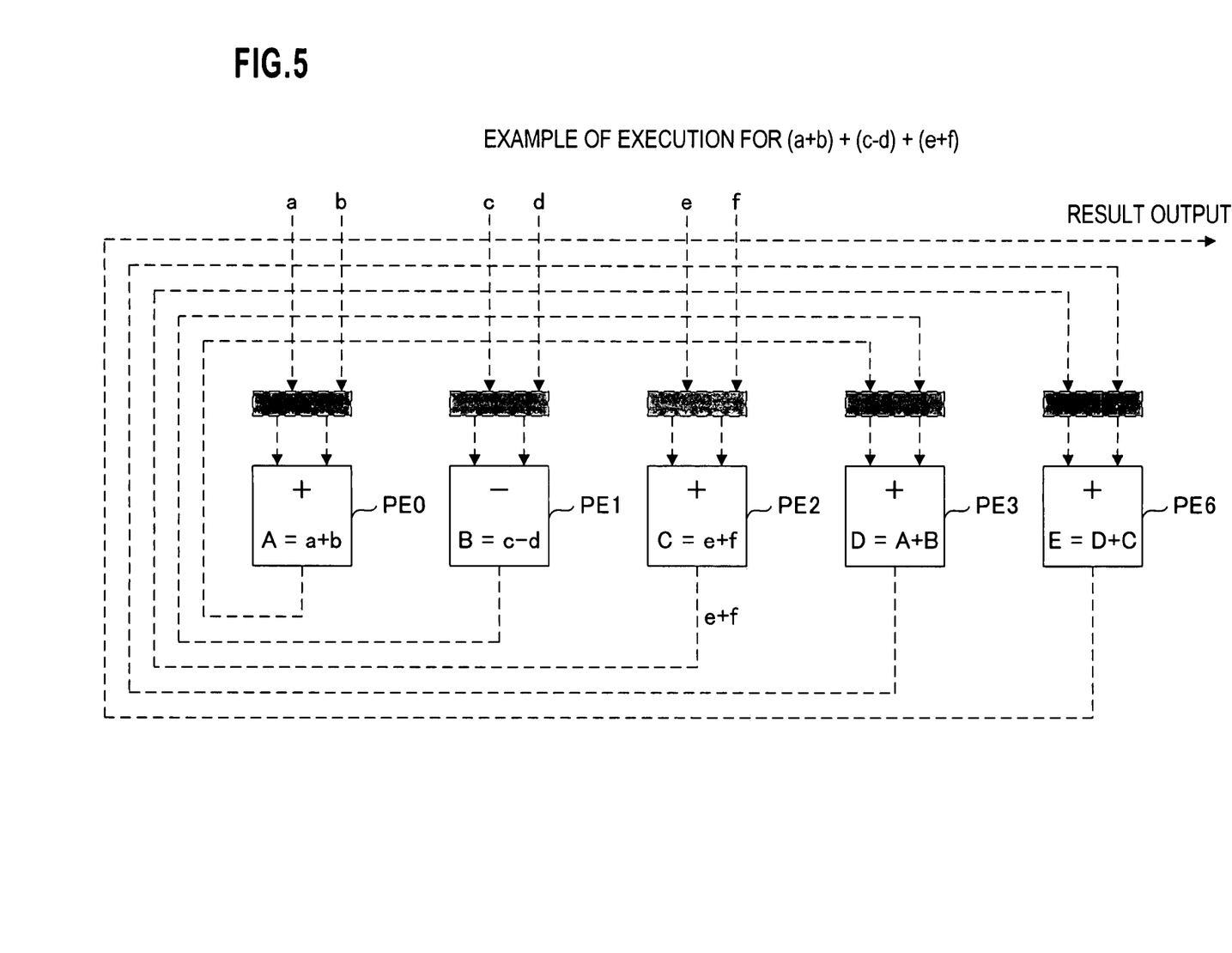
FIG. 5 is a figure showing an example of a circuit state which are configured by configuration data during normal operation, in this embodiment.
Figure 6:
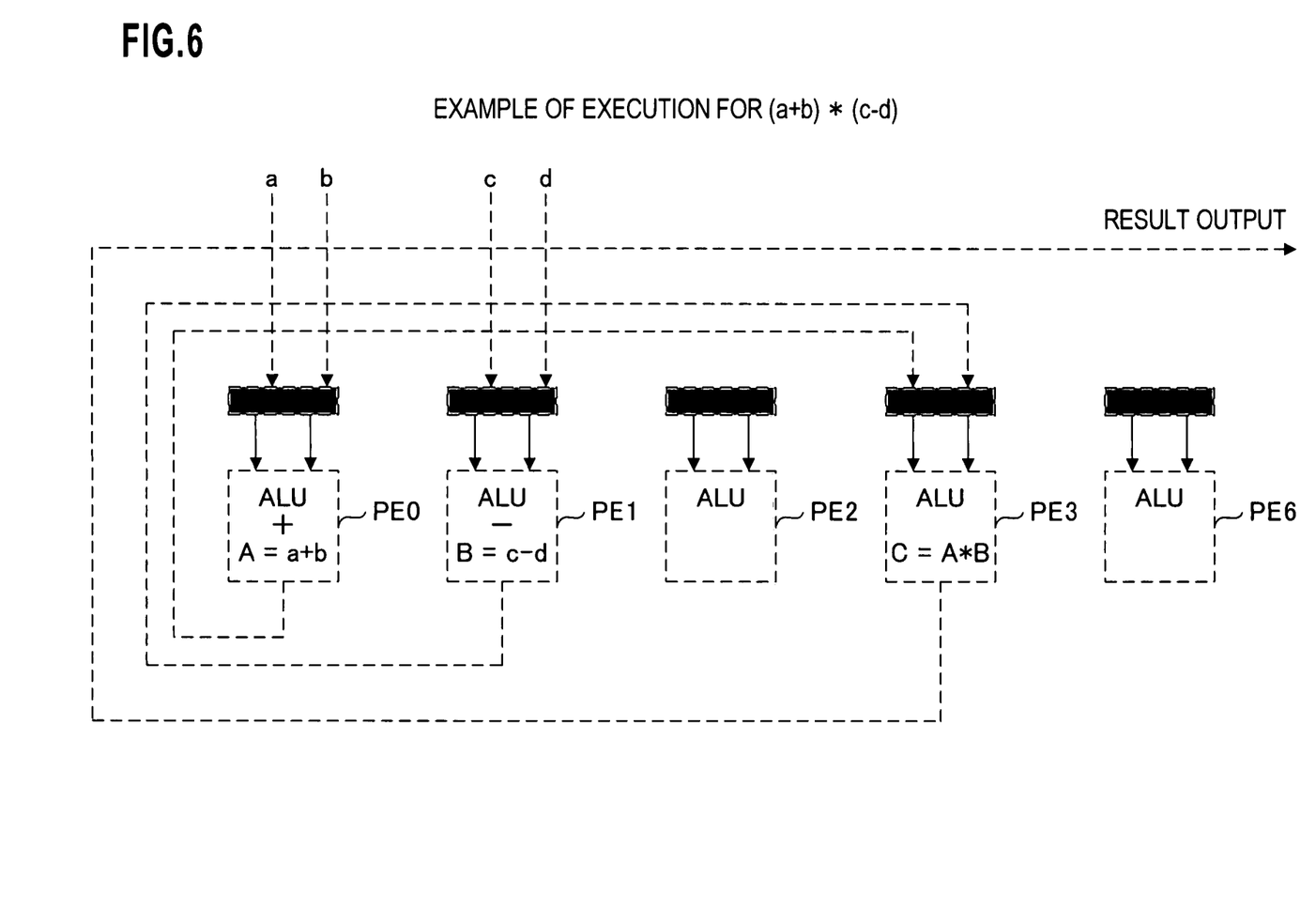
FIG. 6 is another figure showing an example of a circuit state which are configured by configuration data during normal operation, in this embodiment.

FIGS. 5 and 6 are figures showing examples of circuit states which, in this embodiment, are configured by configuration data during normal operation. In these figures, calculation processor elements PE0 through PE3 and PE6 which can be dynamically configured to an arithmetic circuit are connected together by a network 20, to be configured to a dedicated arithmetic circuit which performs a predetermined calculation at high speed.

The example of FIG. 5 is one in which a dedicated arithmetic circuit which performs calculation upon input data items a, b, c, d, e, and f according to the following equation is configured:

$$(a+b)+(c-d)+(e+f)$$

According to this example of configuration: the processor element PE0 is configured as an arithmetic circuit for A=a+b; the processor element PE1 is configured as an arithmetic circuit for B=c−d; the processor element PE2 is configured as an arithmetic circuit for C=e+f; the processor element PE3 is configured as an arithmetic circuit for D=A+B; and the processor element PE6 is configured as an arithmetic circuit for E=D+C. The various data items a through f are supplied from a memory processor element not shown in the figure, and the output of the processor element PE6 is outputted to the memory processor element, or to the exterior, as the result E of the calculation.

The processor elements PE0, PE1, and PE2 perform their calculation processing in parallel; the processor element PE3 performs the calculation processing for D=A+B upon the results of these calculations; and, finally, the processor element PE6 performs the calculation processing for E=D+C. In this manner, it is made possible to perform calculations in parallel by configuring a dedicated arithmetic circuit, so that it is possible to enhance the efficiency of calculation processing.

Each of the calculation processing elements comprises an internal ALU, an adder, a multiplier, a comparator or the like, and can be reconfigured to any arbitrary arithmetic circuit based on the configuration data CD. And, by being configured as shown in FIG. 5, it is possible to configure the above described dedicated arithmetic circuit which performs the above described calculation on a dedicated basis. By configuring this dedicated arithmetic circuit, it is possible to perform a plurality of calculations in parallel, so that it is possible to enhance the efficiency of calculation.

The example of FIG. 6 is one in which the calculation processing elements are configured to a dedicated arithmetic circuit which performs the calculation (a+b)*(c−d) upon the input data items a through d.

The processor element PE0 is configured as an arithmetic circuit for A=a+b; the processor element PE1 is configured as an arithmetic circuit for B=c−d; and the processor element PE3 is configured as an arithmetic circuit for C=A*B; and the result C of this calculation is outputted to the memory processor element or to an external cluster. In this case as well, the processor elements PE0 and PE1 perform their calculation processing in parallel, and the processor element PE3 performs the calculation C=A*B upon the results A and B of their calculations. Accordingly, by configuring this dedicated arithmetic circuit, it is possible to enhance the efficiency of the above described calculation, so that it is possible to enhance the efficiency of performing calculations upon a large volume of data.

A Concrete Example of an Address Generation Circuit for Image Processing

Returning to FIG. 2, when reading out the image data of an enlarged block EBLK1 stored in the internal memory, it becomes necessary to perform the following processings. Firstly, if a pixel being read out is at the pixel column PX on the left edge of the enlarged block EBLK1, then it is checked whether or not the block BLK1 contacts the left edge of the frame FM, and if it does thus contact, then image data of the pixel column PV on the inside is read out instead. Secondly, if the pixel being read out is at the pixel column PX on the right edge of the enlarged block EBLK1, then it is checked whether or not the block BLK1 contacts the right edge of the frame, and if it does thus contact, then image data of the pixel column on the inside is read out instead. Thirdly and fourthly, if the pixel being read out is at the top or the bottom edge as well, then the same processing is performed. Fifthly, if the pixel being read out is not a pixel on any edge, then the image data for this pixel is read out just as it is. Furthermore, if even in the first through the fourth cases the block BLK1 does not contact the edge of the frame, then, since the image data for the pixel on the edge of the enlarged block EBLK1 is the correct image data, accordingly the image data for this pixel is read out just as it is.

Figure 7:
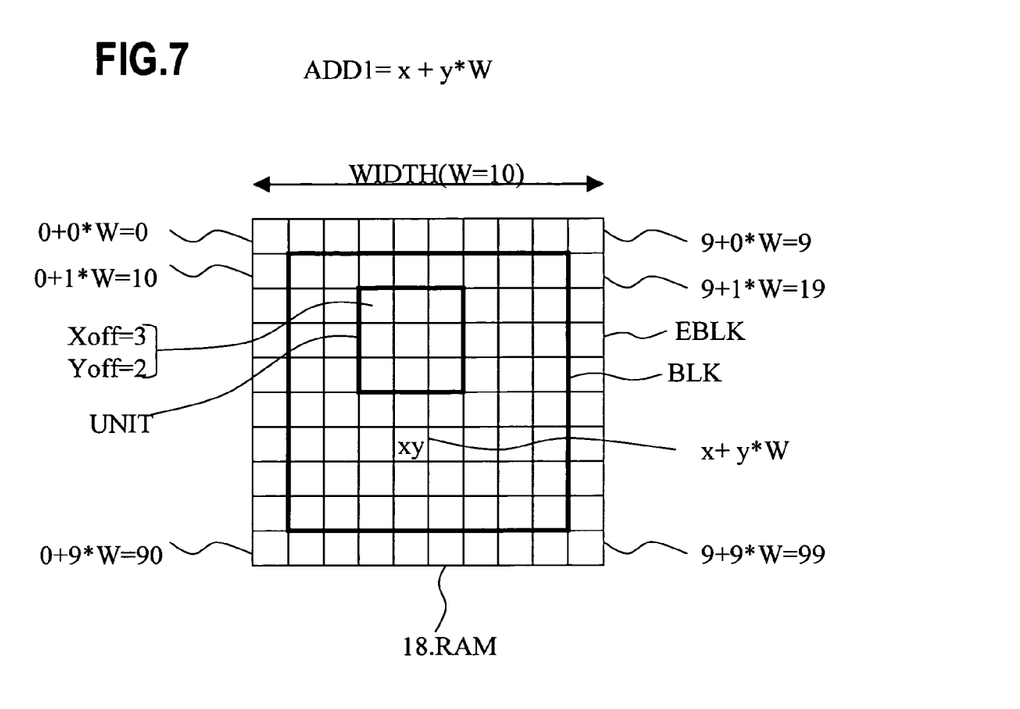
FIG. 7 is a figure for explanation of address generation by the address generation circuit for image processing of this embodiment.

FIG. 7 is a figure for explanation of address generation by the address generation circuit for image processing of this embodiment. In FIG. 7, there is shown a 10×10 pixel array of an enlarged block EBLK which has been stored in the internal memory 18. The data for this enlarged block EBLK which has been enlarged by one surrounding pixel from a block BLK consisting of 8×8 pixels is transferred from the external memory to the internal memory 18. Each of the pixels comprises 8 bits for each of R, G, and B data, for a total of 32 bits of data. This 32 bits of data for each pixel is stored in the internal memory corresponding to the 100 pixels. Accordingly, the address ADD1 in the internal memory goes from address 0 to address 99, and it is possible to obtain ADD1=x+y*W, based on the x and y coordinates of the array of pixels (0,0) (1,0) through (9,0) (this is the first row), (0,1) (1,1) through (9,1) (this is the second row), . . . through (0,9) through (9,9) (this is the tenth row), and the width of the enlarged block W=10. In other words, the address of the pixel (0,0) is ADD1=0; the address of the pixel (9,0) is ADD1=9, . . . the address of the pixel (x, y) is ADD1=x+y*W, and the address of the pixel (9,9) is ADD1=99.

Normally, in image processing, processing is performed for the image data of the required pixels, based on the array information (x, y) of the pixels. Accordingly, an address generation circuit is necessary to generate the address of a pixel in the internal memory from its array information (x, y).

Figure 8:
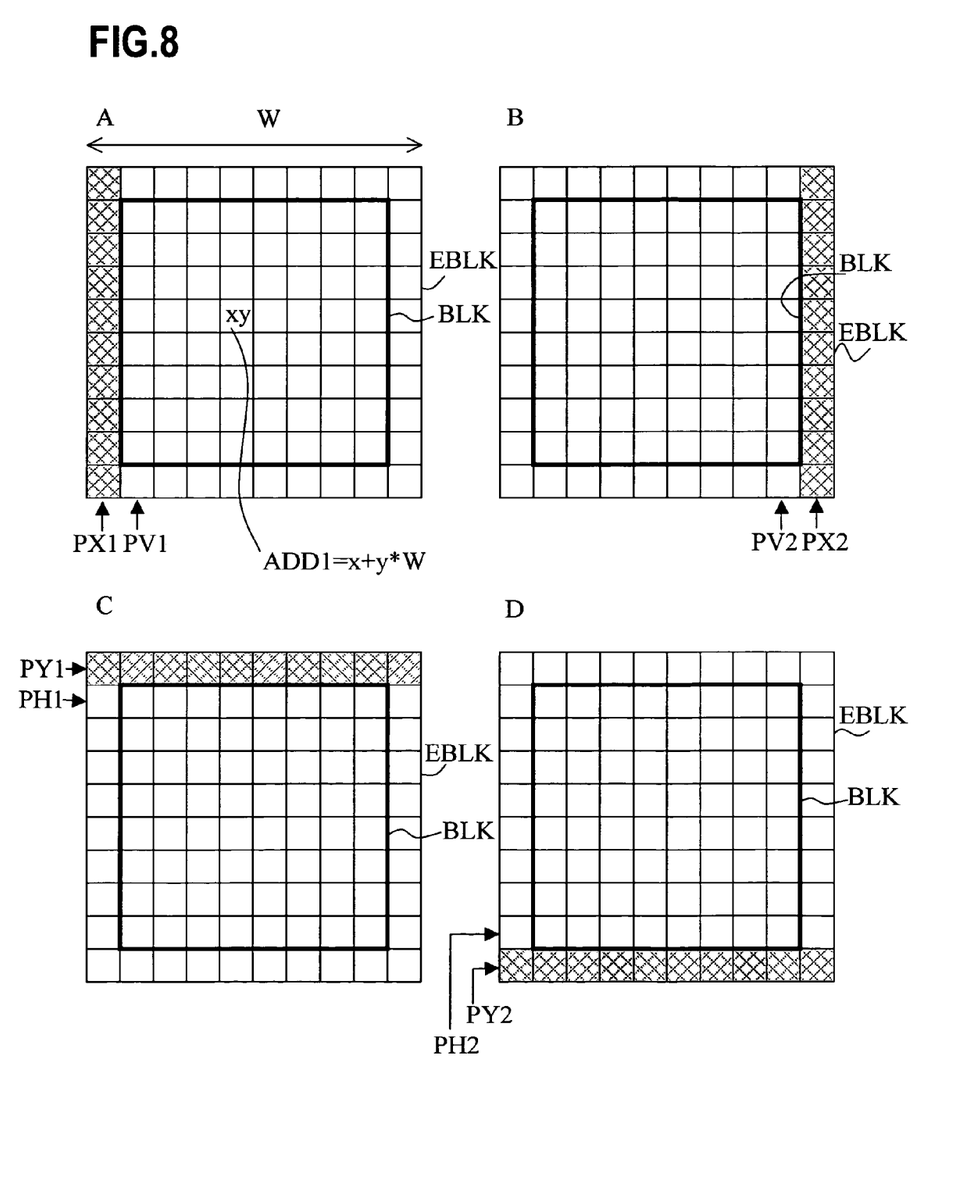
FIG. 8 is a figure for explanation of clip processing during address generation, in this embodiment.

FIG. 8 is a figure for explanation of clip processing during address generation, in this embodiment. In FIG. 8, the cases in which the block BLK stored in the internal memory touches the left, right, top, and bottom edges of the frame are shown. In A in FIG. 8, the block BLK touches the left edge of the frame, and, due to this, the image data for the column PX1 on the left edge is not correct data. In the same manner, in B, C, and D in FIG. 8, the block BLK touches the right, the top, and the bottom edge of the frame respectively, so that the image data for the right edge column PX2, the top edge row PY1, and the bottom edge row PY2, respectively, is not correct data. When transferring data from the external memory, the image data for the enlarged block EBLK which includes the pixels surrounding the block BLK is transferred, but since it is not possible to obtain correct data even though an address outside the edge of the frame is designated, accordingly, as described above, the image data for the pixels shown by hatching in the figure comes to be incorrect.

To explain with reference to the example of A in FIG. 8, the array information for the pixels in the internal memory is as follows, for the X direction and the Y direction:

X direction: 0, 1, 2, . . . 7, 8, 9
Y direction: 0, 1, 2, . . . 7, 8, 9

And the address of the arbitrary pixel in the array (x, y) is ADD1=x+y*W.

However, since the pixels on the left edge are not correct data, without reading out the data for the pixels for which the X direction array information is "0", it is desirable instead to read out the data for the pixels on the left edge of the block BLK. Thus, based on the information that the block BLK is at the left edge of the frame, it becomes necessary to perform clip processing to the array information for the pixels in the internal memory as shown by underlining:

X direction: 1, 1, 2, . . . 7, 8, 9
Y direction: 0, 1, 2, . . . 7, 8, 9

By generating the array information in this manner, and by obtaining the addresses from it, it is possible to read out the data for the pixels in the column PV1, instead of the pixels in the column PX1.

In the case B in FIG. 8, based on the information that the block BLK is the right edge of the frame, the array information shold be:

X direction: 0, 1, 2, . . . 7, 8, 8
Y direction: 0, 1, 2, . . . 7, 8, 9

In the case C in FIG. 8, based on the information that the block BLK is the top edge of the frame, the array information shold be:

X direction: 0, 1, 2, . . . 7, 8, 9
Y direction: 1, 1, 2, . . . 7, 8, 9

In the case D in FIG. 8, based on the information that the block BLK is the bottom edge of the frame, the array information shold be:

X direction: 0, 1, 2, . . . 7, 8, 9
Y direction: 0, 1, 2, . . . 7, 8, 8

Clip processing is performed in each case as shown by the underlining, so as to generate the respective array information as shown, and the addresses may be obtained therefrom.

In other words, the edge information for which clip processing must be performed is generated, and clip processing of the edge portions may be performed, based on the information of the clip numbers which show where clipping must be performed (in the above described example, the clip numbers are 1 and 8).

According to the above described example, the address generation circuit performs the above described clip processing, based on the information as to whether or not the block BLK touches the edges of the frame, and generates the array information (x, y) of the pixels which must be read out, then generating the addresses ADD1=x+y*W. Furthermore, the address generation circuit may also set clip processing to be performed, due to some cause other than such information as to whether or not the block BLK touches the edges of the frame. For example, sometimes clip processing is performed according to some image processing condition. In this case, the address generation circuit is configured to perform clip processing, irrespective of whether or not the block BLK touches the edges of the frame.

Figure 9:
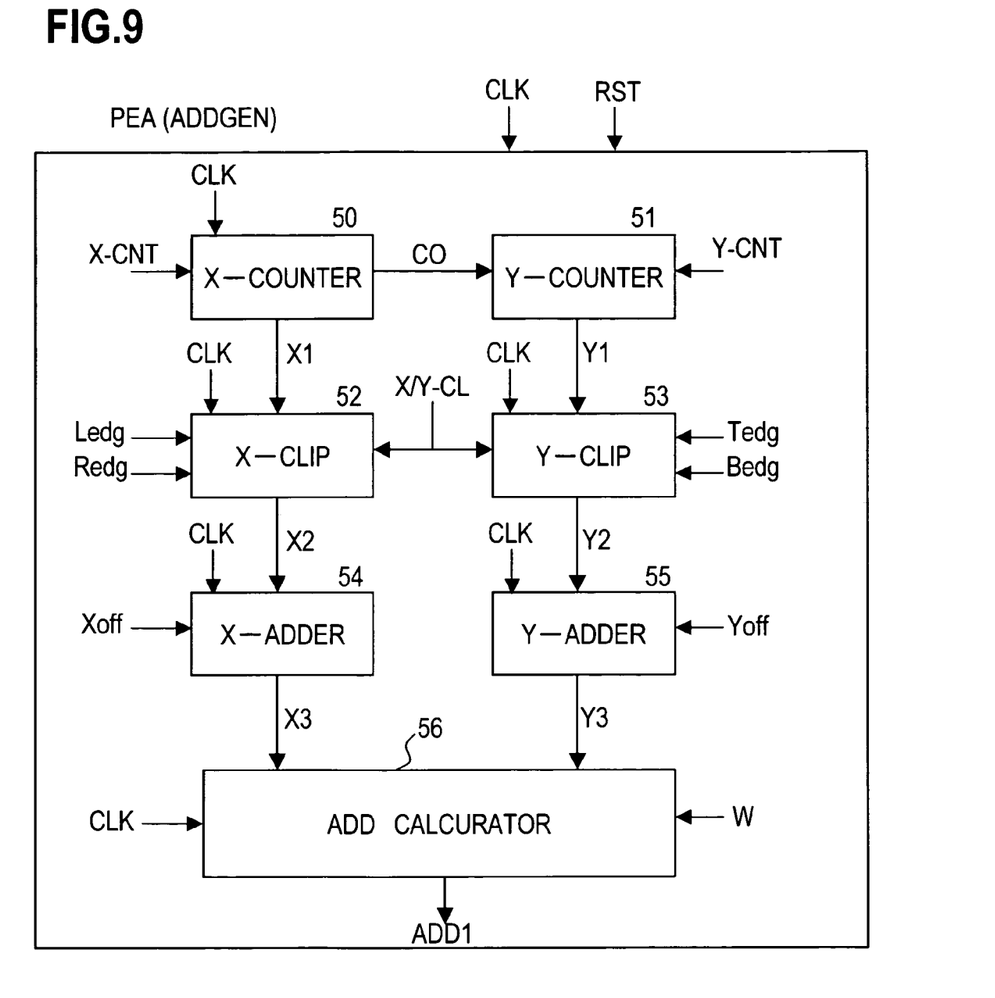
FIG. 9 is an overall block diagram of a processor element from which the address generation circuit of this embodiment is configured.

FIG. 9 is an overall block diagram of a processor element from which the address generation circuit of this embodiment is configured. This address generation circuit comprises an X counter 50 and a Y counter 51 which generate array information (X1,Y1) for the pixels which are read out, clip processing circuits 52 and 53 which perform the above described clip processing, adders 54 and 55 which, upon the generated array information (X2, Y2), perform coordinate conversion of the above described array information, according to the position Xoff,Yoff within the enlarged block of pixel units which is read out, and an address calcuration circuit 56 which generates an address ADD1 in the internal memory based on the generated array information (X3, Y3). This address generation circuit is initialized by a reset signal RST, and operates synchronously with a clock signal CLK.

As shown in FIG. 7, when reading out the image data for all of the pixels in the enlarged block EBLK in the internal memory 18, each of the X and Y counters 50 and 51 outputs "0, 1, 2, . . . 8, 9" as the counter values X1 and Y1. Furthermore if, as shown in FIG. 7, the read out pixel unit UNIT is a portion within the enlarged block EBLK and is positioned at the position Xoff, Yoff within the enlarged block EBLK, the X and Y counters 50 and 51 respectively output "0, 1, 2" as the counter values X1 and Y1, and the array information (X1, Y1) within the pixel unit UNIT is coordinate converted into array information in the internal memory, according to the positional information Xoff=3, Yoff=2, taking the top left as origin.

As described above, the respective end counter values X-CNT and Y-CNT of the read out pixel unit are supplied to the X counter 50 and the Y counter 51. For example, if the enlarged block EBLK is the read out pixel unit, then the counter end values X, Y-CNT=10 are supplied to the X and Y counters 50 and 51, and when the count values become these end values they are reset to "0". And the X counter 50 is counted up in synchrony with the clock signal CLK, while the Y counter 51 is counted up in synchrony with its carry over CO. If a 3×3 pixel unit is being read out, since the counter values come to be "0, 1, 2" repeatedly, accordingly "3" is supplied as the end counter values X, Y-CNT. In other words, the X and Y counters 50 and 51 are set to the count value "0" by the reset, are counted up through "0", "1", and "2", and the initial value "0" is outputted when the count value becomes "3". And the count value of the Y counter 51 is incremented in response to the carry over CO of the X counter 50.

The clip processing circuits 52 and 53 perform clip processing to the array information (X1, Y1) which is generated by this X counter 50 and Y counter 51. Edge information Ledg, Redg as to whether or not clip processing must be performed at the left and right edge of the read out pixel units is supplied to the clip processing circuit 52 for the X side, while edge information Tedg, Bedg as to whether or not clip processing must be performed at the top and bottom edge of the read out pixel units is supplied to the clip processing circuit 53 for the Y side. Furthermore, clip numbers X-CL and Y-CL are also supplied to the clip processing circuit 52 and 53. For example, if it is desired to perform clip processing at the left edge, then the clip number X-CL "1" for the X direction is supplied, and the array information X1 is converted according to the clip number X-CL. Furthermore, if it is desired to perform clip processing at the right edge, then the clip number X-CL "8" is supplied, and the array information X1 is converted according to the clip number X-CL. In the same manner, if it is desired to perform clip processing at the top or bottom edge, then the clip number Y-CL for the Y direction is supplied, and the array information Y1 is converted according to this clip number.

If the pixel unit being read out is an enlarged block of 10×10 pixels, then the clip number X-CL will be X-CL=1 at the left edge, while at the right edge it will be X-CL=8. Furthermore, if it is desired to subject two surrounding pixels' to clip processing, then at the left edge X-CL=2, while at the right edge X-CL=7. Yet further, if the pixel unit being read out is 5×5 pixels, and it is desired to clip one surrounding pixel, then the above described clip number X-CL at the left edge is X-CL=1, while at the right edge it is X-CL=3. Even further, if it is desired to subject two surrounding pixels to clip processing, then at both the left and the right edges it is X-CL=2.

As shown in FIG. 8, in cases where the block BLK in the internal memory touches the left, right, top, or bottom edge of the frame, and clip processing is performed when reading out the pixels there, if the block touches the left edge of the frame, and the pixel unit being read out touches the left edge of the enlarged block, then the left edge information Redg is set to "1". In the same manner, if the block touches the top edge of the frame, and the pixel unit being read out touches the top edge of the enlarged block, then the top edge information Tedg is set to "1".

Apart from this, if for some other cause clip processing needs to be performed at any edge of the pixel unit being read out, then it is possible, by setting the edge information to "1", to perform clip processing upon the array information (X1, Y1) within a pixel unit being read out under any arbitrary condition. In other words, it is possible to set the clip processing condition in a flexible manner.

The adders 54 and 55 which perform coordinate conversion add the array positions Xoff, Yoff of the top left pixel of the pixel unit respectively to the count values (X2, Y2) which have been subjected to clip processing, and output array information (X3, Y3). This array information (X3, Y3) corresponds to array information within the enlarged block. The width W of the enlarged block is supplied to the address calcuration circuit 56, and the address ADD1 in the internal memory is obtained by the calculation from the array information (X3, Y3) which has been calculated and the width W.

The various data items X-CNT, Y-CNT, Xoff, Yoff, Ledg, Redg, Tedg, Bedg and W described above are supplied from the control unit 10 of FIG. 3 as the configuration data CD, and, based upon this configuration data, configured in an address generation circuit for reading out the specified pixel unit. In other words, the control unit 10: sets the count end values X-CNT and Y-CNT, according to the size of the pixel unit being read out; sets the clip numbers X-CL and Y-CL, according to the clip number; sets edge information which indicates whether or not clip processing must be performed, according as to whether the pixel unit being read out touches any edge of the frame, or according to some other condition; and sets the position information Xoff and Yoff, according to the position of the pixel unit being read out within the enlarged block. Furthermore, it sets the width W, according to the size of the enlarged block which has been data transferred into the internal memory. According to the settings of these configuration data items, the processor elements PEA are dynamically set up into the most suitable address generation circuit.

Figure 10:
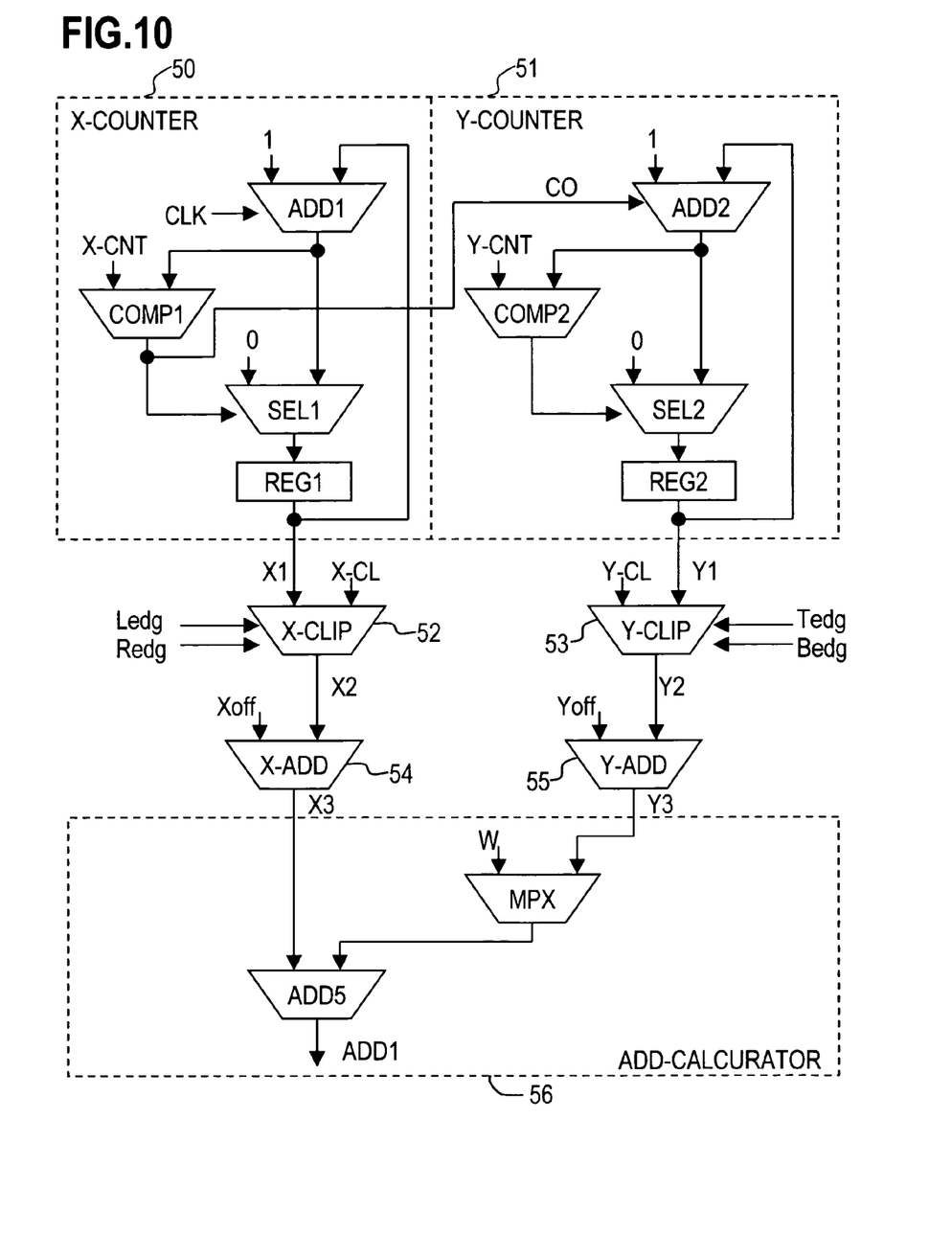
FIG. 10 is a detailed circuit diagram of an address generation circuit of this embodiment.
Figure 11:
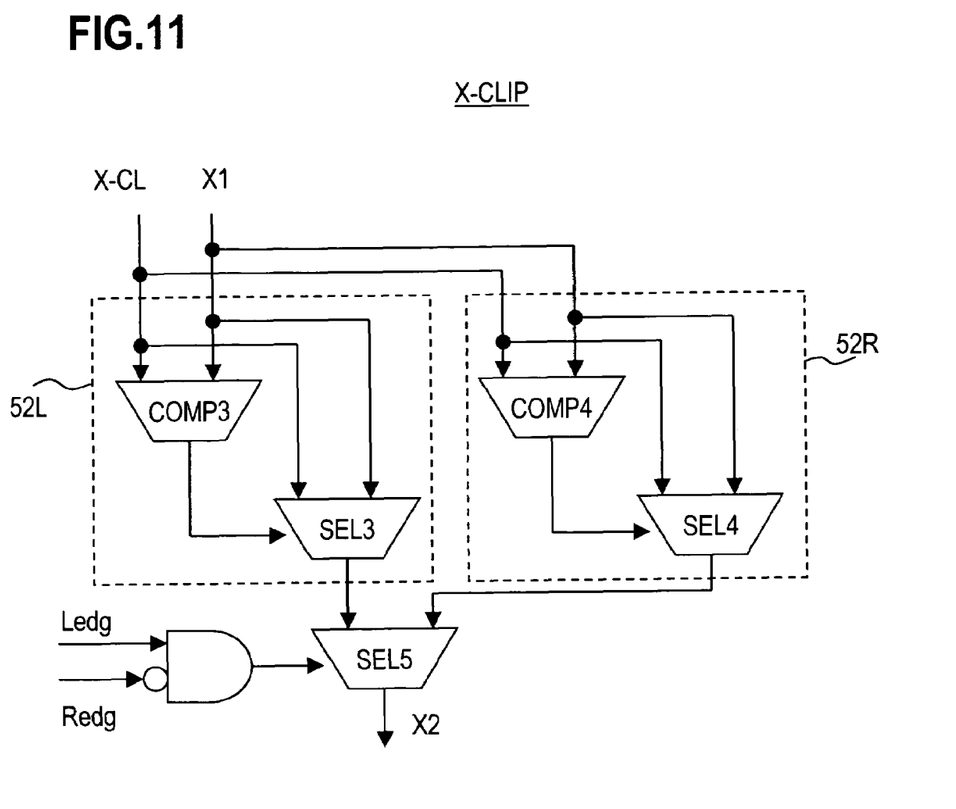
FIG. 11 is a detailed circuit diagram of a clip circuit.

FIG. 10 is a detailed circuit diagram of an address generation circuit of this embodiment. Moreover, FIG. 11 is a detailed circuit diagram of a clip circuit. An X counter 50 comprises: an adder ADD1 which, in synchrony with a clock signal CLK, increments a count value X1 within a register REG1 by "1" each time; a comparator COMP1 which detects whether or not the output of the adder ADD1 agrees with the count end value X-CNT; a selector SEL1 which selects the output of the adder ADD1 or an initial value "0" according to the result of comparison by the comparator COMP1; and a register REG1 which stores the counter value X1. Furthermore, the value in the register REG1 is reset to its initial value "0" in response to a reset signal RST, although this is not shown in the figure.

In the same manner, a Y counter 51 comprises an adder ADD2, a comparator COMP2, a selector SEL2, and a register REG2. The adder ADD2 adds "1" to the counter value Y1 in synchrony with a carry over signal CO. Furthermore, the register REG2 is reset to its initial value "0" in response to the reset signal RST, although this is not shown in the figure. As described above, the X and Y counters 50, 51 generate array information (X1, Y1) for the read out pixel unit, according to the count end values X-CNT, Y-CNT which are dynamically supplied.

The clip processing circuits 52 and 53 perform the required clip processing to the array information (X1, Y1) of this pixel unit, according to the supplied edge information Ledg, Redg, Tedg, Bedg and clip numbers X-CL, Y-CL which must be subjected to clip processing. In FIG. 11, the clip processing circuit for the X axis is shown. This clip processing circuit comprises: comparators COMP3 and COMP4 which compare together the array information X1 and the clip number X-CL; selectors SEL3 and SEL4 which select either the array information X1 or the clip number X-CL, according to the output of the respective comparator; and a selector SEL5 which selects the output of either the selector SEL3 or the selector SEL4, according to the edge information Ledg, Redg.

A processing circuit 52L which comprises the comparator COMP3 and the selector SEL3 performs clip processing upon the left edge, while a processing circuit 52R which comprises the comparator COMP4 and the selector SEL4 performs clip processing upon the right edge. To explain the processing circuit 52L: if X1>X-CL, the output of the comparator COMP3 becomes "1" and the selector SEL3 selects the counter output X1, while otherwise the output of the comparator COMP3 becomes "0" and the selector SEL3 selects the clip number X-CL (for example 1, in the case of a 5×5 pixel unit). On the other hand, to explain the processing circuit 52R: if X1<X-CL, the output of the comparator COMP4 becomes "0" and the selector SEL4 selects the counter output X1, while otherwise the output of the comparator COMP4 becomes "1" and the selector SEL4 selects the clip number X-CL (for example 3, in the case of a 5×5 pixel unit). 1 And the selector SEL5 selects either the output of the selector SEL3 or the output of the selector SEL4, according to the edge information Ledg and Redg.

By setting the clip number X-CL according to the edge information Ledg and Redg in this manner, clip processing at the left edge or the right edge within the pixel unit being readout becomes possible. The Y side clip processing circuit as well is the same as the circuit of FIG. 11.

To explain, as an example, the case of reading out the 3×3 pixel unit shown in FIG. 7 from the internal memory, the counters 50 and 51 each generates the array information "0, 1, 2" within the pixel unit. And information as to at which edge of this pixel unit it is required to perform clip processing is supplied as edge information. If it is considered necessary to perform clip processing at the left edge, then Ledg=1 is set, and the clip number X-CL=1 is set. As a result, when the counter value X1=0 or 1, the output of the comparator COMP3 becomes "0", and the selector SEL3 outputs the clip number X-CL=1; while, when the counter value X1=2, the output of the comparator COMP3 becomes "1", and the selector SEL3 outputs the clip number X1=2.

In the case of a 5×5 pixel unit, the counter value X1 becomes "0, 1, 2, 3, 4", and, when the right edge Redg=1 and the clip number X-CL=3 are set, the values X2 which have been clip processed become "0, 1, 2, 3, 3". In other words, the clip processing is performed according to the clip number which has been set by the edge position set within the read out pixel unit.

Furthermore, in the case of the read out pixel unit being a 10×10 enlarged block, the counter value X1 becomes "0, 1, 2, 3, 4, 5, 6, 7, 8, 9", and, when the right edge Redg=1 and the clip number X-CL=8 are set, the values X2 which have been clip processed become "0, 1, 2, 3, 4, 5, 6, 7, 8, 8"

The adders 54 and 55 add the position information Xoff, Yoff of the read out pixel unit to the counter values X2, Y2 which have been clip processed respectively, and outputs the coordinate converted positional information X3, Y3. If the read out pixel unit is all of the enlarged block, then the position information Xoff, Yoff are both "0". Furthermore, if the read out pixel unit is a portion within an enlarged block as in FIG. 7, then the position information is Xoff=3, Yoff=2. And the address calcuration circuit 56 comprises a multiplier MPX which multiplies the width W into the Y count value Y3, and an adder ADD5 which adds the X count value X3 into the multiplication result Y3*W. The output of the adder ADD5 becomes the address ADD1 in the internal memory.

Figure 12:
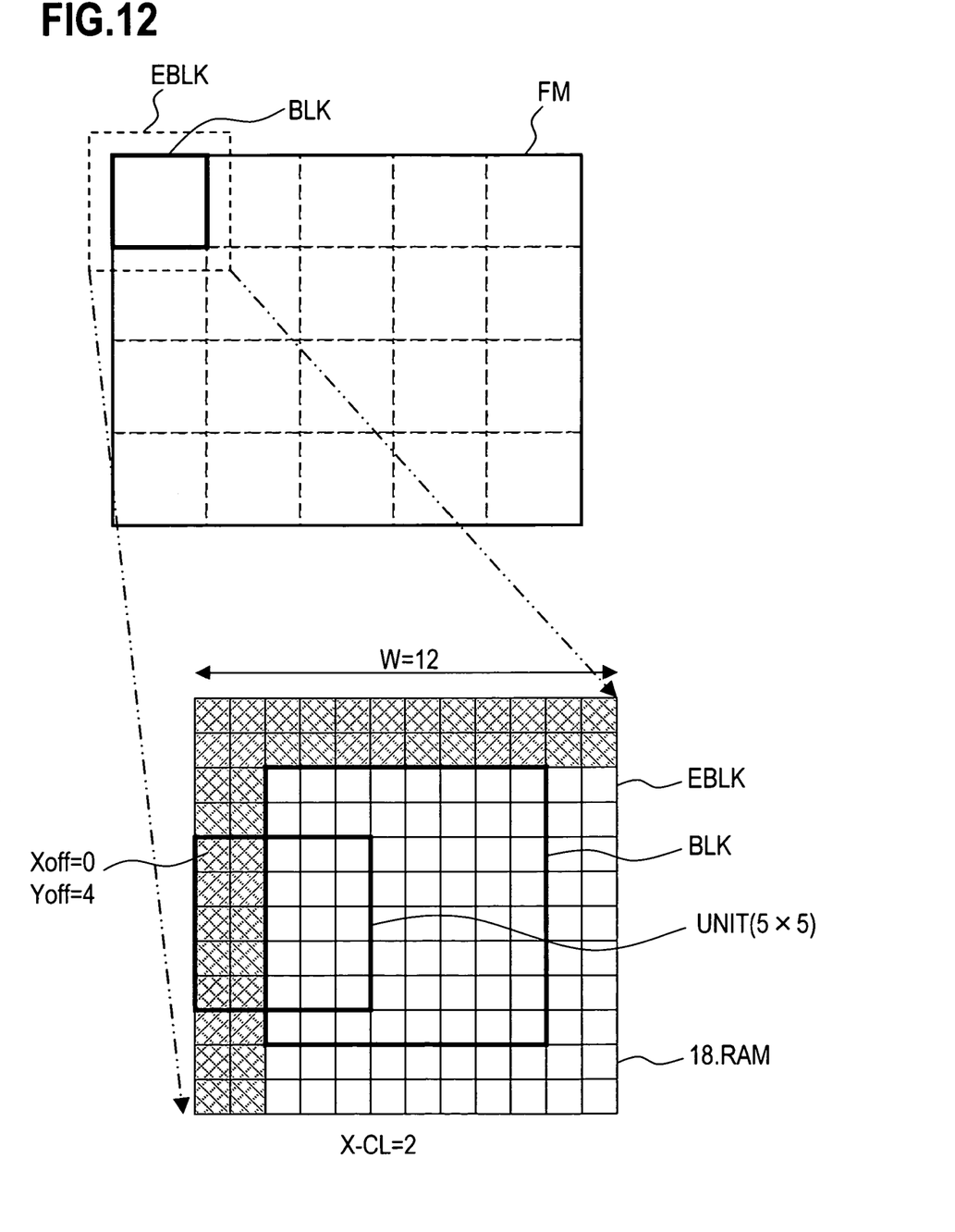
FIG. 12 is a figure showing another example of image data.

FIG. 12 is a figure showing another example of image data. This figure is one which corresponds to FIG. 2, and, in this example, an enlarged block EBLK comprising an 8×8 pixel block added with two surrounding pixels is stored in the internal memory 18. And since, when a 5×5 pixel unit is being read out from the internal memory, it becomes necessary to perform two pixels worth of clip processing for the left edge, accordingly the clip number X-CL=2 is set, and the offset position of the pixel unit is set to Xoff=0, Yoff=4. And the counters 50 and 51 generate "0, 1, 2, 3, 4" as the counter values X1, Y1, and the clip processing circuit 52 performs clip processing upon the counter value X1 and generates the values X2 "2, 2, 2, 3, 4". And the position information Xoff=0 is added to the value X2, while the position information Yoff=4 is added to the value Y2.

By the above, the address generation circuit of this embodiment is able, by setting the previously described data as configuration data, to generate addresses for reading out a pixel unit of any arbitrary size in any arbitrary position in the internal memory. Moreover, it is able to set the clip processing at the edge portions, which are specific and peculiar to the image processing, arbitrarily. Furthermore it is able to perform clip processing at any edge, irrespective of whether or not the read out pixel unit touches an edge, and to avoid reading out data for pixels at the edge of the pixel unit.

In the address generation circuit shown in FIGS. 9 and 10, the clip processing circuit performed clip processing according to the counter values X1 and Y1 of the counters 50 and 51. As a variant embodiment, the clip processing circuit may be arranged to perform its clip processing after having added the position information Xoff and Yoff of the pixel unit to the counter values X1, Y1. In other words, the structure may be one with adders 54 and 55 and the clip processing circuits 52 and 53 interchanged. In this case, by supplying edge information as to whether or not the block BLK stored in the internal memory touches the left, right, top, or bottom edge of the frame, it is possible to read out the image data for the pixels at the edge of the frame repeatedly, without reading out any incorrect image data outside the frame. And, in this case, the clip numbers X-CL and Y-CL which are supplied to the clip processing circuit are set to values which correspond to the positional information (X1+Xoff, Y1+Yoff) of the enlarged block EBLK. Thus, with this type of structure, when reading out a pixel unit at an edge position of the frame and performing clip processing, reading out of image data outside the frame is avoided.

What is claimed is:

1. A reconfigurable address generation circuit for image processing, which is configured to an arbitrary state based upon configuration data, and which generates a read address for reading out image data of pixel units having a plurality of rows and columns from a memory which stores image data of an enlarged block, having a block including at least a partial pixel group within a frame, and pixels surrounding the block, wherein
- as the configuration data, there are set a X count end value corresponding to a number of columns of the read out pixel unit and a Y count end value corresponding to a number of rows of the read out pixel unit, a width value which indicates the number of columns of the enlarged block, and edge information which indicates an edge, for which clip processing is performed on the read out pixel unit,
- the address generation circuit comprising:
- an X counter which counts repeatedly up to the X count end value;
- a Y counter which counts up to the Y count end value in response to a carry signal of the X counter;
- an X clip processing circuit which converts the count value of the X counter according to the left and right edge information;
- a Y clip processing circuit which converts the count value of the Y counter according to the top and bottom edge information; and
- an address calculation circuit which generates the reading out address, based upon the count values from the X and Y clip processing circuits and the width value.

2. The address generation circuit for image processing according to claim 1, wherein
- as the configuration data, a clip value which specifies a position for clip processing is set;
- the X clip processing circuit, if the edge information relates to the left edge, converts the count value of the X counter to the clip value when the count value is smaller than the clip value, and, if the edge information relates to the right edge, converts the count value of the X counter to the clip value when the count value is greater than the clip value; and
- the Y clip processing circuit, if the edge information relates to the top edge, converts the count value of the Y counter to the clip value when the count value is smaller than the clip value, and, if the edge information relates to the bottom edge, converts the count value of the Y counter to the clip value when the count value is greater than the clip value.

3. The address generation circuit for image processing according to claims 1, wherein, as the configuration data, position information of the read out pixel unit within the enlarged block is further set,
- the address generation circuit further comprising an adding circuit which adds the position information to output count values of the clip processing circuit.

4. The address generation circuit for image processing according to claim 1, wherein the edge information is set to a value for instructing clip processing, if the read out pixel unit touches any of the left, right, top, or bottom edge of the frame.

5. The address generation circuit for image processing according to claim 1, wherein the edge information is set to a value for instructing clip processing, if a predetermined condition is satisfied.

6. A reconfigurable address generation circuit for image processing, which is configured into an arbitrary state based upon configuration data, and which generates a read address for reading out image data of pixel units having a plurality of rows and columns from a memory which stores image data, wherein
- as the configuration data, there are set a X count end value corresponding to a number of columns of the read out pixel unit and a Y count end value corresponding to a number of rows of the read out pixel unit, a width value which indicates the number of columns of the image in the memory, and edge information which indicates an edge, for which clip processing is performed on the read out pixel unit,
- the address generation circuit comprising:
- an X counter which counts repeatedly up to the X count end value;
- a Y counter which counts up to the Y count end value in response to a carry signal of the X counter;
- an X clip processing circuit which converts the count value of the X counter according to the left and right edge information;
- a Y clip processing circuit which converts the count value of the Y counter according to the top and bottom edge information; and
- an address calculation circuit which generates the reading out address, based upon the count values from the X and Y clip processing circuits and the width value.

7. The address generation circuit for image processing according to claim 6, wherein
- as the configuration data, a clip value which specifies a position for clip processing is set;
- the X clip processing circuit, if the edge information relates to the left edge, converts the count value of the X counter to the clip value when the count value is smaller than the clip value; and, if the edge information relates to the right edge, converts the count value of the X counter to the clip value when the count value is greater than the clip value; and
- the Y clip processing circuit, if the edge information relates to the top edge, converts the count value of the Y counter to the clip value when the count value is smaller than the clip value; and, if the edge information relates to the bottom edge, converts the count value of the Y counter to the clip value when the count value is greater than the clip value.

8. The address generation circuit for image processing according to claim 6, wherein, as the configuration data, position information of the read out pixel unit within the image of the memory is set;
- the address generation circuit further comprising an adding circuit which adds the position information to output count values of the clip processing circuit.

9. A reconfigurable Large Scale Integrated Circuit, comprising:
- the address generation circuit for image processing according to any of claims 1 through 8, and
- a state control circuit which generates the configuration data.

* * * * *